(12) United States Patent
Koulikov et al.

(10) Patent No.: US 11,499,868 B2
(45) Date of Patent: Nov. 15, 2022

(54) LOW NOISE CAVITY ENHANCED ABSORPTION SPECTROSCOPY APPARATUS AND METHOD

(71) Applicant: Picarro, Inc., Santa Clara, CA (US)

(72) Inventors: Serguei Koulikov, Los Altos, CA (US); Alejandro Dario Farinas, Mountain View, CA (US)

(73) Assignee: Picarro. Inc., Santa Clara, CA (US)

(*) Notice: Subject to any disclaimer, the term of this patent is extended or adjusted under 35 U.S.C. 154(b) by 80 days.

(21) Appl. No.: 17/177,146

(22) Filed: Feb. 16, 2021

(65) Prior Publication Data

US 2022/0260418 A1   Aug. 18, 2022

(51) Int. Cl.
*G01J 3/42* (2006.01)
*G01J 3/12* (2006.01)
*G01J 3/02* (2006.01)

(52) U.S. Cl.
CPC ............... *G01J 3/42* (2013.01); *G01J 3/021* (2013.01); *G01J 3/0218* (2013.01); *G01J 3/12* (2013.01); *G01J 2003/1291* (2013.01)

(58) Field of Classification Search
None
See application file for complete search history.

(56) References Cited

U.S. PATENT DOCUMENTS

| | | | |
|---|---|---|---|
| 7,012,696 B2 | 3/2006 | Orr | |
| 7,535,573 B2 | 5/2009 | Kachanov | |
| 7,649,189 B2 | 1/2010 | Cole | |
| 7,768,647 B2 | 8/2010 | Reeve | |
| 8,237,927 B1 | 8/2012 | Reeve | |
| 2003/0189711 A1* | 10/2003 | Orr | G01J 3/42 356/484 |
| 2005/0254056 A1* | 11/2005 | Kachanov | G01J 3/42 356/437 |
| 2007/0195319 A1* | 8/2007 | Kachanov | G01J 3/42 356/302 |
| 2007/0195434 A1 | 8/2007 | Koulikov | |
| 2011/0216311 A1* | 9/2011 | Kachanov | H01S 5/0064 356/213 |
| 2018/0372618 A1 | 12/2018 | Kwak | |
| 2019/0025203 A1* | 1/2019 | Koulikov | G01N 21/39 |
| 2020/0225126 A1 | 7/2020 | Sur | |

OTHER PUBLICATIONS

Lee et al., "Optimization of the mode matching in pulsed cavity ringdown spectroscopy by monitoring non-degenerate transverse mode beating", 2002, Appl. Phys. B 74, 435-440.
Huang et al., "Noise in cavity ring-down spectroscopy caused by transverse mode coupling", 2007, Optics Express vol. 15, No. 14.
(Continued)

*Primary Examiner* — Shawn Decenzo
(74) *Attorney, Agent, or Firm* — Lumen Patent Firm

(57) ABSTRACT

Noise in cavity enhanced spectroscopy due to higher order mode excitation in a resonant cavity is reduced. There are two main points. The first point is that the source and detector are both fiber coupled, to provide the spatial filtering and other general advantages of fiber coupling. The second point is that the cavity is designed to ensure sufficient separation in frequency between the desired $TEM_{00}$ mode and the first few higher order spatial modes.

21 Claims, 7 Drawing Sheets

(56) References Cited

OTHER PUBLICATIONS

Scheps, "Introduction to Laser Diode-Pumped Solid State Lasers", 2002, chapter 2.
Barriga et al., "Optical design of a high power mode-cleaner for AIGO", 2005, Gen. Relativ. Gravit. 37(9): 1609-1619.
He et al., "Remote open-path cavity-ringdown spectroscopic sensing of trace gases in air, based on distributed passive sensors linked by km-long optical fibers", 2014, Optics Express, vol. 22, No. 1 I.
Waechter et al., "Chemical Sensing Using Fiber Cavity Ring-Down Spectroscopy", 2010, Sensors v10, 1716-1742.

\* cited by examiner

LOW NOISE CAVITY ENHANCED ABSORPTION SPECTROSCOPY APPARATUS AND METHOD

FIELD OF THE INVENTION

This invention relates to cavity enhanced optical spectroscopy.

BACKGROUND

Cavity ring-down spectroscopy (CRDS) is considered to be a method immune to laser intensity noise. It is true when a single transverse cavity mode is excited in time. More specifically, for the simplest case of a CRDS instrument having a linear cavity and having an optical system having a single cavity mode excited in time, the CRDS noise is only defined by electronics noise and/or shot noise.

However, if multiple transverse cavity modes are excited it would cause an additional noise because the cavity losses usually depend on the spatial distribution of the intracavity electric field. Very often high order transverse cavity modes are close in frequency to the desired $TEM_{00}$ mode according to the cavity design (see for example U.S. Pat. No. 7,535,573). In that case both the laser driver noise and cavity pressure noise may create a situation where multiple transverse cavity modes are simultaneously excited. Moreover, the non-zero linewidth of the laser light may also lead to an excitation of multiple transverse cavity modes. Accordingly, it would be an advance in the art to provide cavity enhanced laser spectroscopy with improved single-mode operation.

SUMMARY

To minimize the effect of the additional CRDS noise due to a high order mode excitation in a resonant cavity we provide a system with a strict double spatial filtering of the light measured by a detector, where the contribution of the intensity of high order mode(s) to the total signal is less than 1%. Briefly there are two main points. The first point is that the source and detector are both fiber coupled, to provide the spatial filtering and other general advantages of fiber coupling. The second point is that the cavity is designed to ensure sufficient separation in frequency between the desired $TEM_{00}$ mode and the first few higher order spatial modes. These points are described in further detail below.

In preferred embodiments, improved polarization control is also provided. The motivation for this is that a two mirror cavity may have different losses depending on a polarization of the coupled laser beam due to a mechanical stress in multilayer coating, an asymmetry of the film deposition process, or an asymmetry of the substrate polishing process. If the laser polarization is not stable in time it will cause additional errors in concentration measurements. When a cavity having more than two mirrors is used, the cavity asymmetry removes the cavity mode degeneracy. Moreover, because an intracavity beam hits one of the cavity mirrors at an angle different from the normal, the mirror reflection will be different for S- and P-polarized beam. If there is no polarization control of the incident beam in the system, such polarization dependence of the cavity losses can create an additional noise due to excitation both orthogonal polarizations in the cavity.

DETAILED DESCRIPTION

Figure 1:
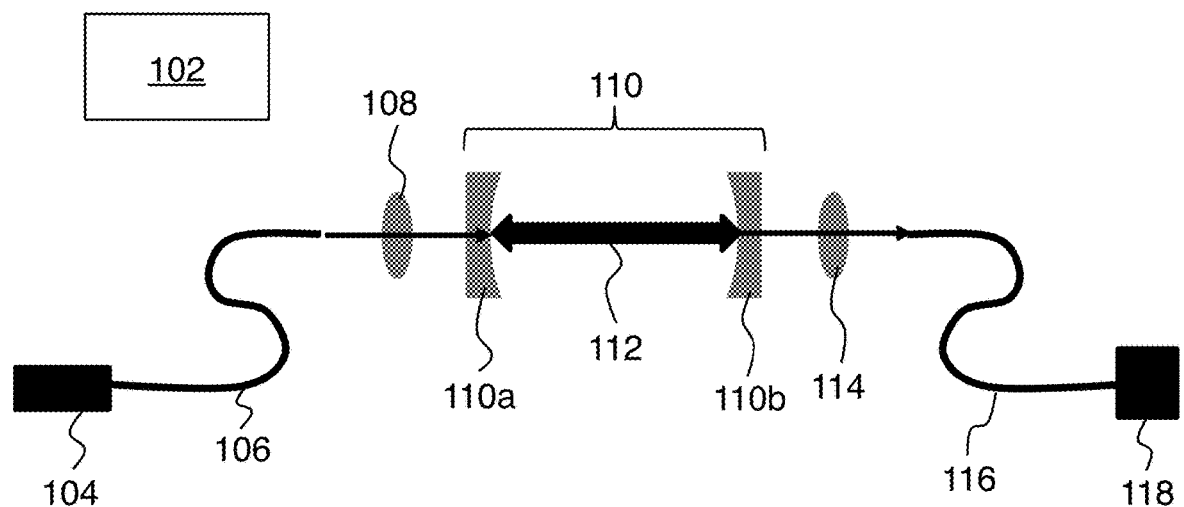
FIG. 1 shows a first embodiment of the invention.

FIG. 1 shows a first embodiment of the invention. This example is an apparatus for performing low noise cavity enhanced absorption spectroscopy (CEAS). Here cavity enhanced absorption spectroscopy refers to any optical absorption spectroscopy technique that relies on an optical cavity, including but not limited to: cavity ring-down spectroscopy (CRDS) and incoherent broad-band cavity-enhanced absorption spectroscopy (IBBCEAS). The following specific examples mainly relate to CRDS.

The apparatus of this example includes a resonant optical cavity 110 configured to include a gas sample, where the resonant optical cavity supports $TEM_{mnq}$ modes having longitudinal index q and transverse indices m and n, and where $f_{mnq}$ is a frequency of the $TEM_{mnq}$ mode. In this example, optical cavity 110 is formed by mirrors 110a and 110b. The apparatus also includes an optical source 104 configured to provide light to the resonant optical cavity, where the light from the optical source has a full-width half-maximum line width $\Delta f_L$, and where the light from the optical source has a tunable output frequency. The apparatus further includes an optical detector 118 configured to receive light from the resonant optical cavity. Finally, the apparatus includes a processor 102 configured to determine concentration of one or more gas analytes in the gas sample from measurements of loss in the resonant optical cavity 110.

Light is coupled from the optical source 104 to the optical cavity via first coupling optics (lens 108 and fiber 106) including a first single mode optical fiber 106 coupled to the resonant optical cavity 110. The first coupling optics provides first mode selective coupling of the optical source 104 to a selected $TEM_{mnq}$ mode ($TEM_{00q0}$) 112 of the resonant optical cavity having m=n=0 and q=q0, where the $TEM_{00q0}$ mode 112 has a frequency $f_{00q0}$ and has a full-width half-maximum line width $\Delta f_{00q0}$.

Light is coupled from the resonant optical cavity 110 to the optical detector via second coupling optics (lens 114 and fiber 116) including a second single mode optical fiber 116 coupled to the resonant optical cavity 110. The second coupling optics provides second mode selective coupling of the $TEM_{00q0}$ mode 112 to the optical detector 118.

The round trip path length of the resonant optical cavity is selected such that the modes $TEM_{mnq}$ for 0<m+n<13 and for all q satisfy a design condition given by $|f_{mnq} - f_{00q0}| > \max(\Delta f_L, \Delta f_{00q0})$. This design constraint is described in greater detail below.

Let η1 be the coupling efficiency of the first mode selective coupling from the optical source to the $TEM_{00q0}$ mode. The first mode selective coupling preferably provides a coupling efficiency of 0.1η1 or less from the optical source to any $TEM_{mnq}$ mode of the resonant optical cavity having m+n>0. In other words, the coupling from the source to the cavity is preferably mode-selective.

Let η2 be the coupling efficiency of the second mode selective coupling from the $TEM_{00q0}$ mode to the optical detector. The second mode selective coupling preferably provides a coupling efficiency of $0.1\eta2$ or less from any $TEM_{mnq}$ mode of the resonant optical cavity having m+n>0 to the optical detector. In other words, the coupling from the cavity to the detector is preferably mode-selective.

Processor 102 can be configured to determine the loss in the resonant optical cavity 110 from a ring-down time of the resonant optical cavity 110. Alternatively, processor 102 can be configured to determine the loss in the resonant optical cavity from absorption in the resonant optical cavity. Processor 102 can be configured to determine a temperature and a pressure of the gas sample with a spectroscopic method.

The first single mode optical fiber 106 and the second single mode optical fiber 116 can be selected from the group consisting of: polyimide coated optical fibers and infrared optical fibers.

The resonant optical cavity 110 can include a resonant optical cavity body structure made of a first material, where the first material is a glass (e.g., silicon dioxide glass) or a glass ceramic. The resonant optical cavity 110 can have a first end and a second end, and can include an inlet port for receiving a gaseous sample medium and an outlet port. Mirrors 110a and 110b can be made of a material having the same or a substantially similar coefficient of thermal expansion as the first material.

Preferably the first single mode optical fiber and the second single mode optical fiber are CTE (coefficient of thermal expansion) matched to the resonant optical cavity body to 10% or better.

Lenses 108 and 114 can be made of a material having the same or a substantially similar coefficient of thermal expansion as the first material. Any or all of the cavity mirrors, coupling optics, and optical fibers can be bonded using the hydroxide catalyzed hydration and dehydration method (U.S. Pat. No. 6,284,085, hereby incorporated by reference in its entirety).

Practice of the invention does not depend critically on coupling optics components that can be present in addition to the single mode optical fibers. As indicated above, the single mode fibers are required because they provide an important spatial filtering function that helps provide the mode selectivity.

Figure 2:
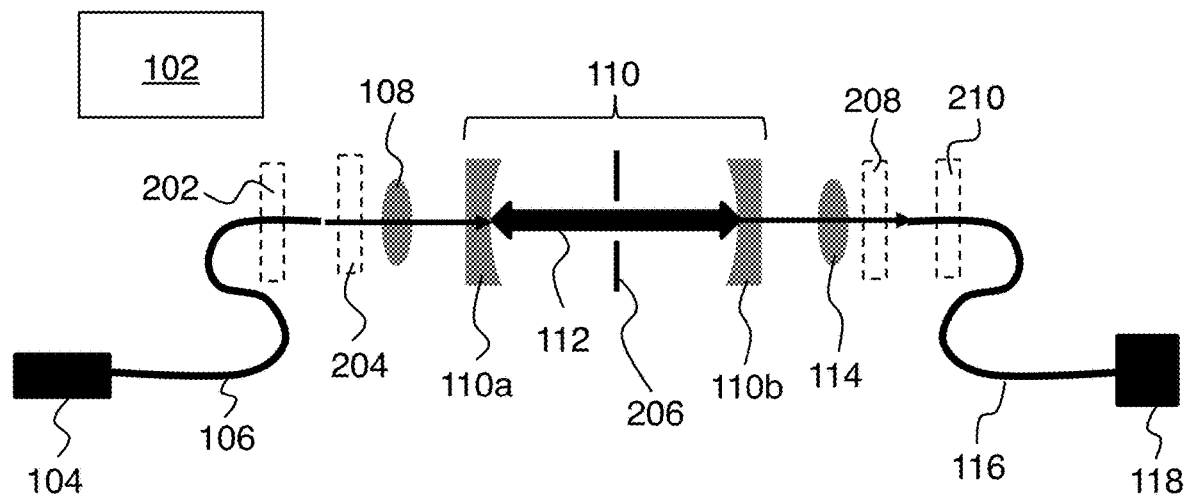
FIG. 2 shows a second embodiment of the invention.

FIG. 2 shows a second embodiment of the invention, where several options for the coupling optics are shown. The input coupling optics can include a polarizer disposed at location 204 configured to provide polarization selective excitation of modes of the resonant optical cavity. Alternatively, the first single mode optical fiber 106 can be a polarization-maintaining fiber. The second single mode optical fiber 116 can be a polarization-maintaining fiber.

The first coupling optics can include a Faraday isolator configured to provide optical isolation of the first single mode optical fiber from light emitted from the resonant optical cavity 110 toward the first single mode optical fiber 106. This Faraday isolator can be a free space component disposed at location 204 or a fiber component disposed at location 202.

Similarly, the second coupling optics can include a Faraday isolator configured to provide optical isolation of the resonant optical cavity 110 from light reflected by the second single mode optical fiber 116. This Faraday isolator can be a free space component disposed at location 208 or a fiber component disposed at location 210.

An optical aperture 206 can be placed in the resonant optical cavity. Let FWHM be the full width half maximum beam diameter of the $TEM_{00q0}$ mode 112 at a location of the aperture, and let a beam radius parameter $w=FWHM/\sqrt{2 \ln 2}$). Preferably the distance between any point on an edge of the aperture and the axis of the $TEM_{00q0}$ mode 112 is in a range from 3 w to 12 w. So in the case of a circular aperture, the aperture radius is preferably between 3 w and 12 w.

Figure 3A:
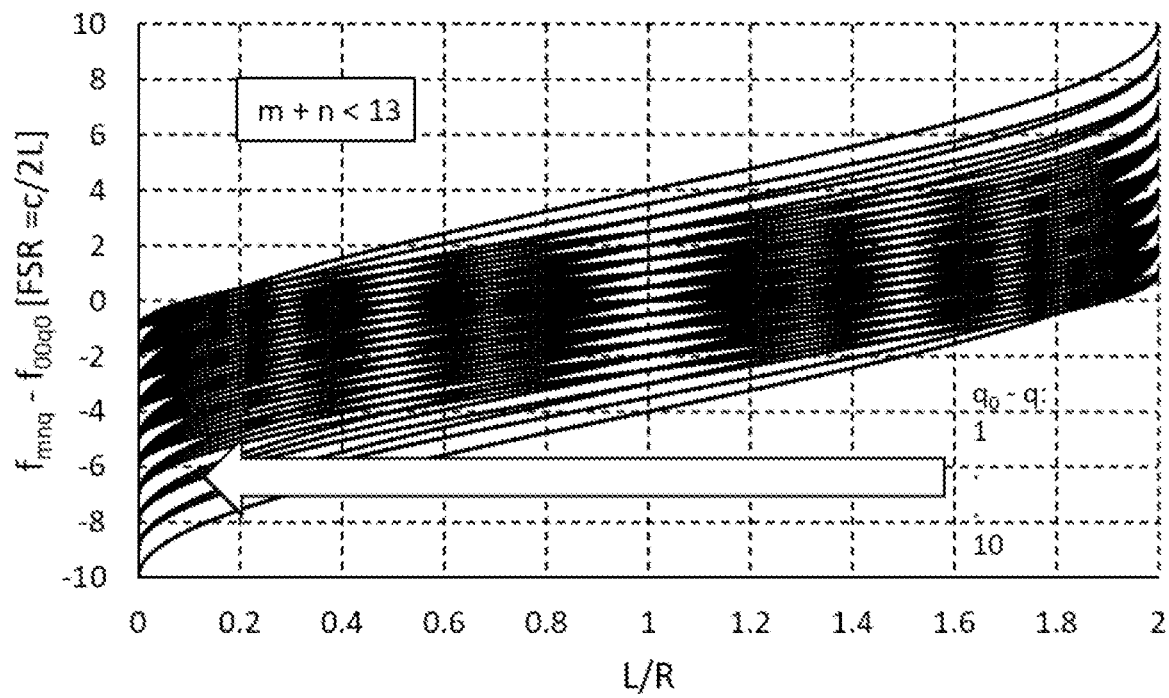
FIGS. 3A-C show exemplary cavity mode frequencies for various cavity designs.
Figure 3B:
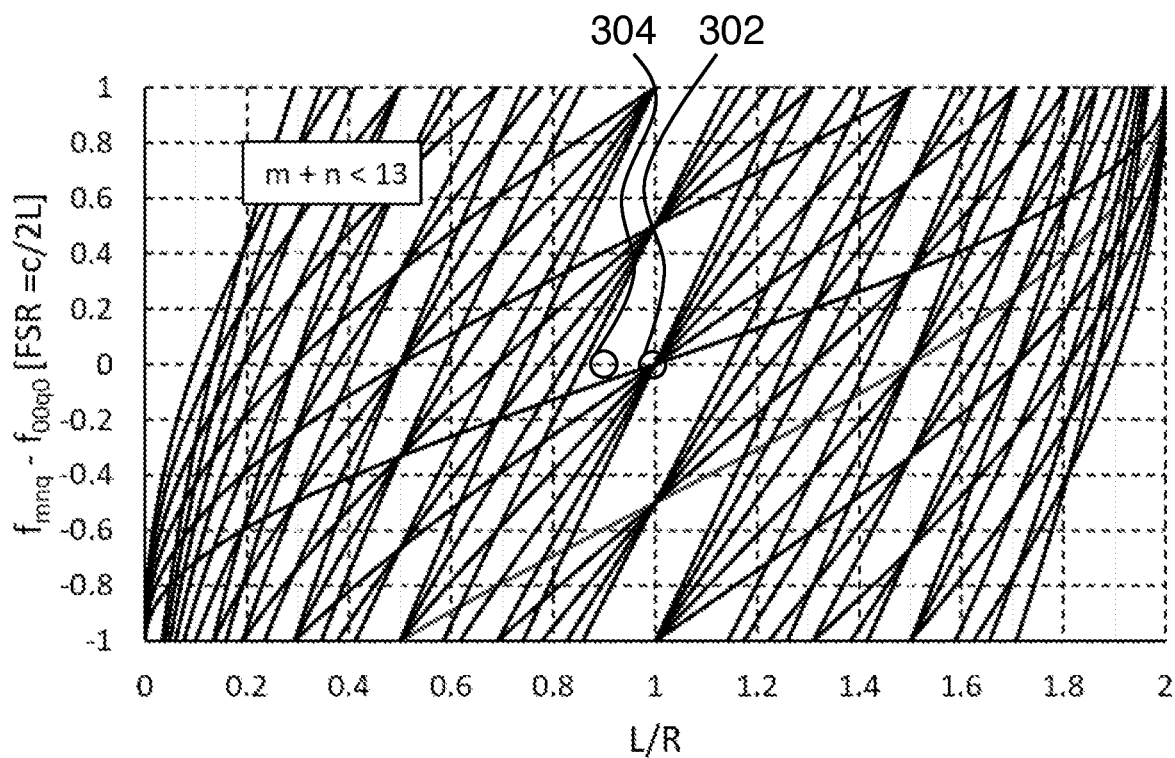
Figure 3C:
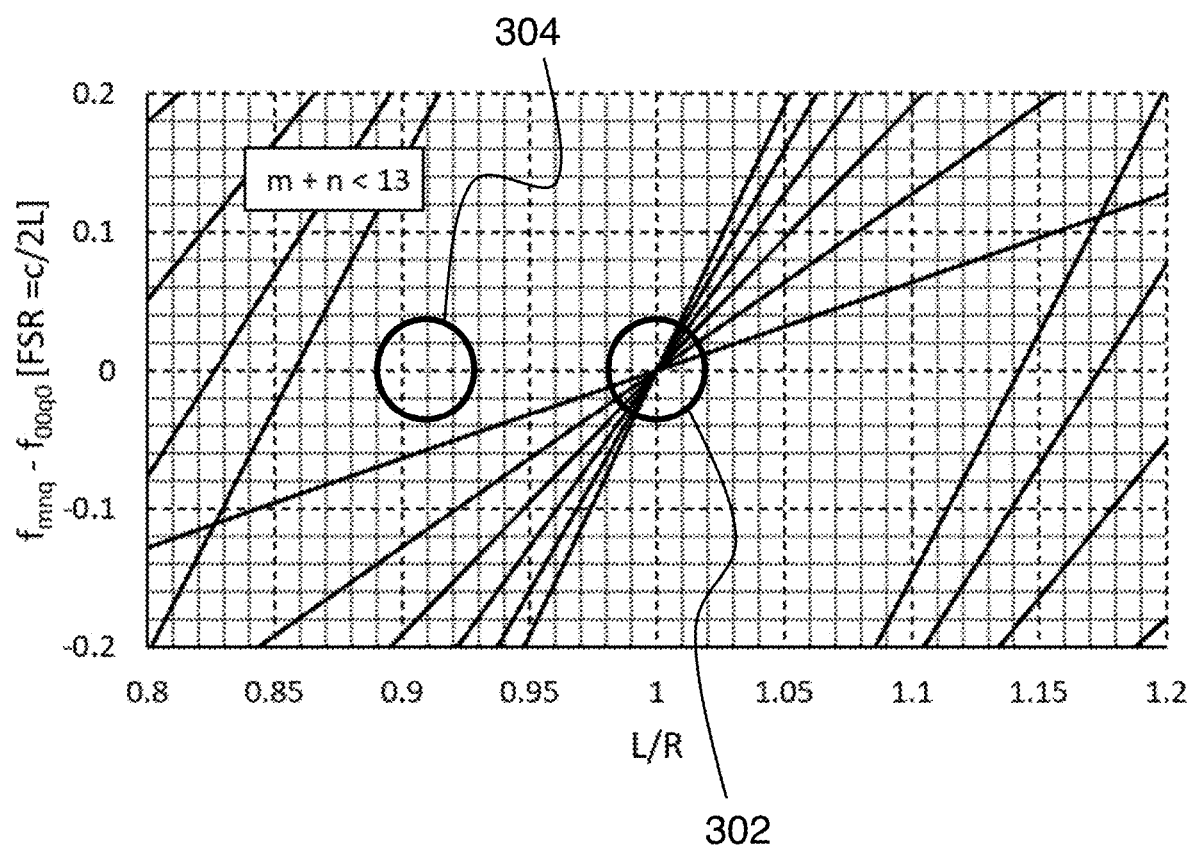

FIGS. 3A-C show exemplary cavity mode frequencies for various cavity designs. FIG. 3B is an enlarged vertical view of the plot of FIG. 3A. FIG. 3C is an enlarged view of FIG. 3B. What is shown on these plots are the mode frequencies (vertical axis) for the low order (0<m+n<13) transverse $TEM_{mnq}$ modes as the cavity design varies (horizontal axis), relative to the lowest order mode frequency $f_{00q0}$. Here the cavity is a symmetric two mirror cavity, so L/R where L is cavity length and R is mirror radius of curvature is the only cavity design parameter.

We see that L/R=1 (design 302) is a poor design because several higher order transverse modes have the same frequency as the desired $TEM_{00q0}$ mode. In contrast, design 304 with L/R roughly 0.91 is an example of a good design, since the higher order transverse modes have frequencies that are away from the frequency of the desired $TEM_{00q0}$ mode. Graphically, the bigger we can make a circle on the $f_{mnq}-f_{00q0}=0$ line without it intersecting one or more of the plotted lines, the better the design is in terms of providing frequency separation between higher order transverse modes and the desired lowest order transverse mode. As indicated above, the round trip path length of the resonant optical cavity is selected such that the modes $TEM_{mnq}$ for 0<m+n<13 and for all q satisfy a design condition given by $|f_{mnq}-f_{00q0}|>\max(\Delta f_L, \Delta f_{00q0})$. With reference to FIGS. 3A-C, this can be understood as specifying the radius of circle 304 as being the larger of the laser linewidth $\Delta f_L$, and the cavity linewidth $\Delta f_{00q0}$ of the lowest order mode, provided the vertical axis is scaled to frequency instead of to multiples of the free spectral range. So the acceptable designs are those values of L/R for which such a circle on the $f_{mnq}-f_{00q0}=0$ line doesn't intersect any plotted line. Analysis along similar lines can be performed for more complicated cavity configurations such as ring cavities and folded linear cavities.

Figure 4A:
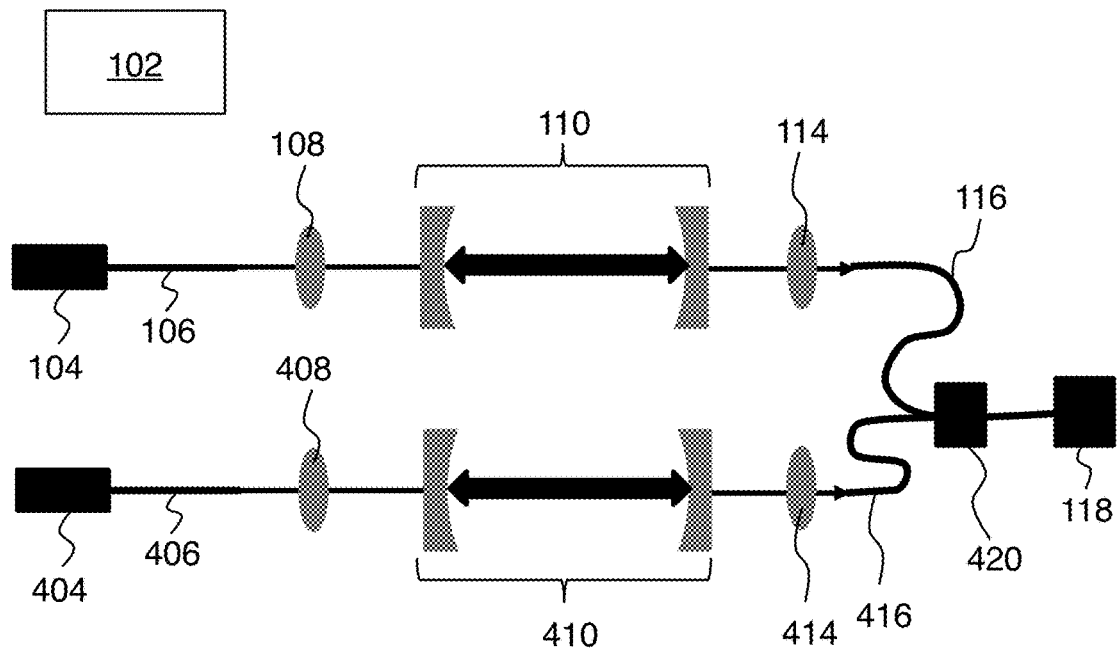
FIGS. 4A-B show further embodiments of the invention.
Figure 4B:
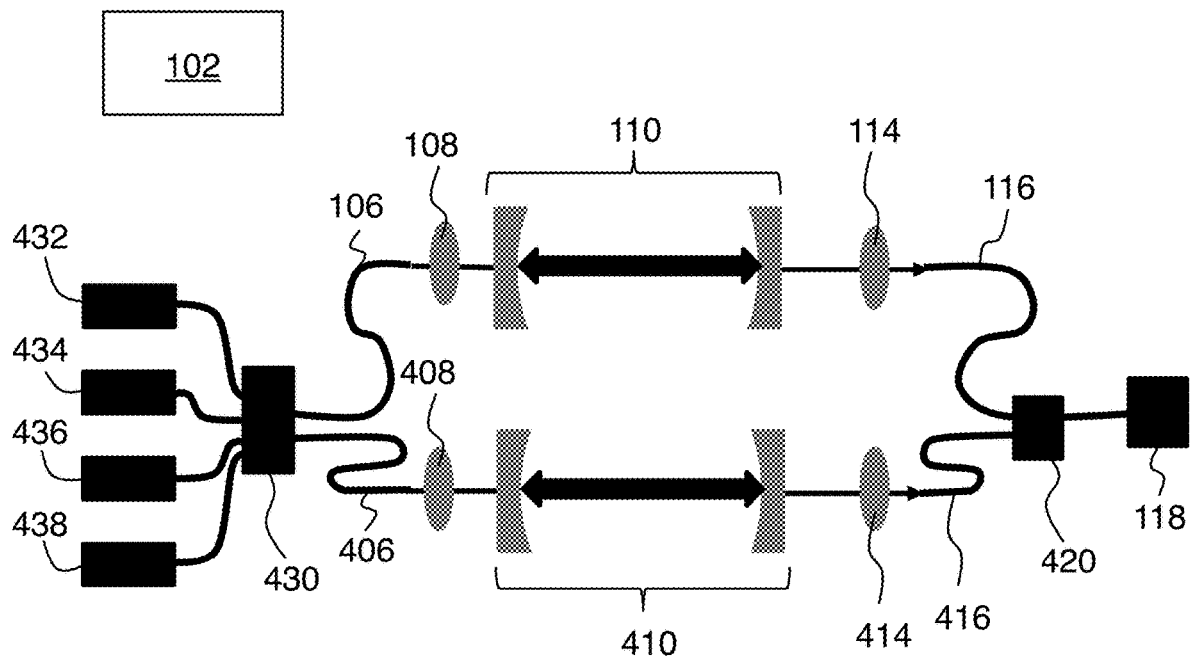

FIGS. 4A-B show further embodiments of the invention. In the example of FIG. 4A, a single detector 118 is coupled to two instruments with a fiber coupled combiner 420. Here source 404, fiber 406, lens 408, cavity 410, lens 414, fiber 416 correspond to source 104, fiber 106, lens 108, cavity 110, lens 114, and fiber 116 as described above. The example of FIG. 4B extends the example of FIG. 4A by providing an fiber coupled input router 430 configured to provide light from any of sources 432, 434, 436, 438 to the two instruments.

More generally, embodiments can further include at least one of the following: a fiber optic WDM (wavelength division multiplexer), a fiber optic splitter, a fiber optic switch, and a fiber optic router placed in an optical path between the resonant optical cavity and the optical detector. Embodiments can also further include at least one of the following: a fiber optic semiconductor optical amplifier, a fiber optic modulator, a fiber optic WDM, a fiber optic splitter, a fiber optic switch, and a fiber optic router placed in an optical path between the optical source and the resonant optical cavity. Any such embodiments can further include an intelligent unit capable of configuring fiber optic routes to connect one or more optical sources to one or more resonant cavities and of configuring fiber optic routes to connect one or more resonant cavities to one or more optical detectors.

Figure 5:
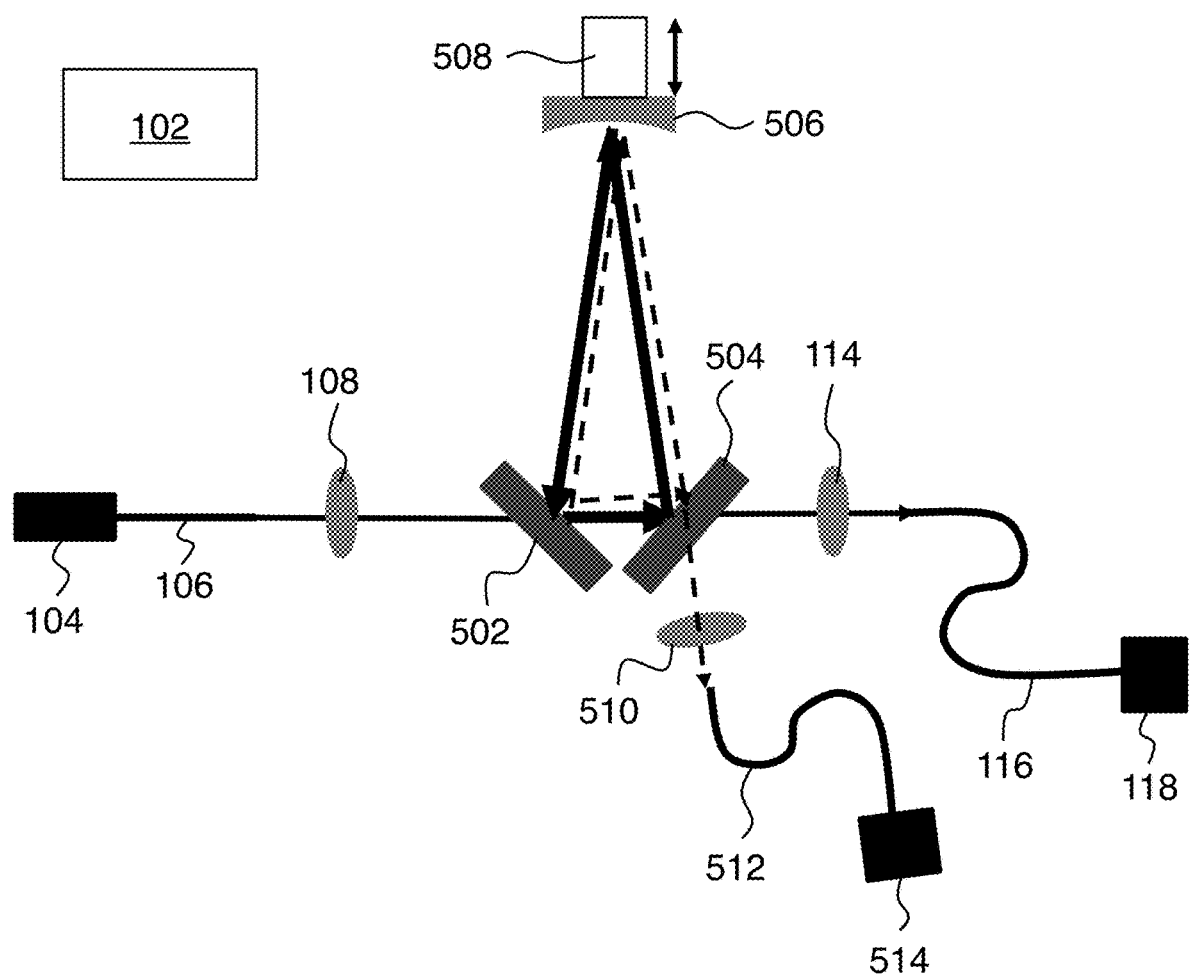
FIG. 5 shows an embodiment of the invention having a ring cavity.

FIG. 5 shows an embodiment of the invention having a ring cavity. Here the cavity is formed by mirrors 502, 504 and 506. Optionally a mechanical transducer 508 is present and configured to change the round trip path length of the resonant optical cavity. This approach is one method of providing ring down events for CRDS. Optionally, backward propagating light in the ring cavity (dashed lines) can be monitored with a second detector 514 which can be fiber coupled to the cavity via fiber 512 and lens 510.

Figure 6:
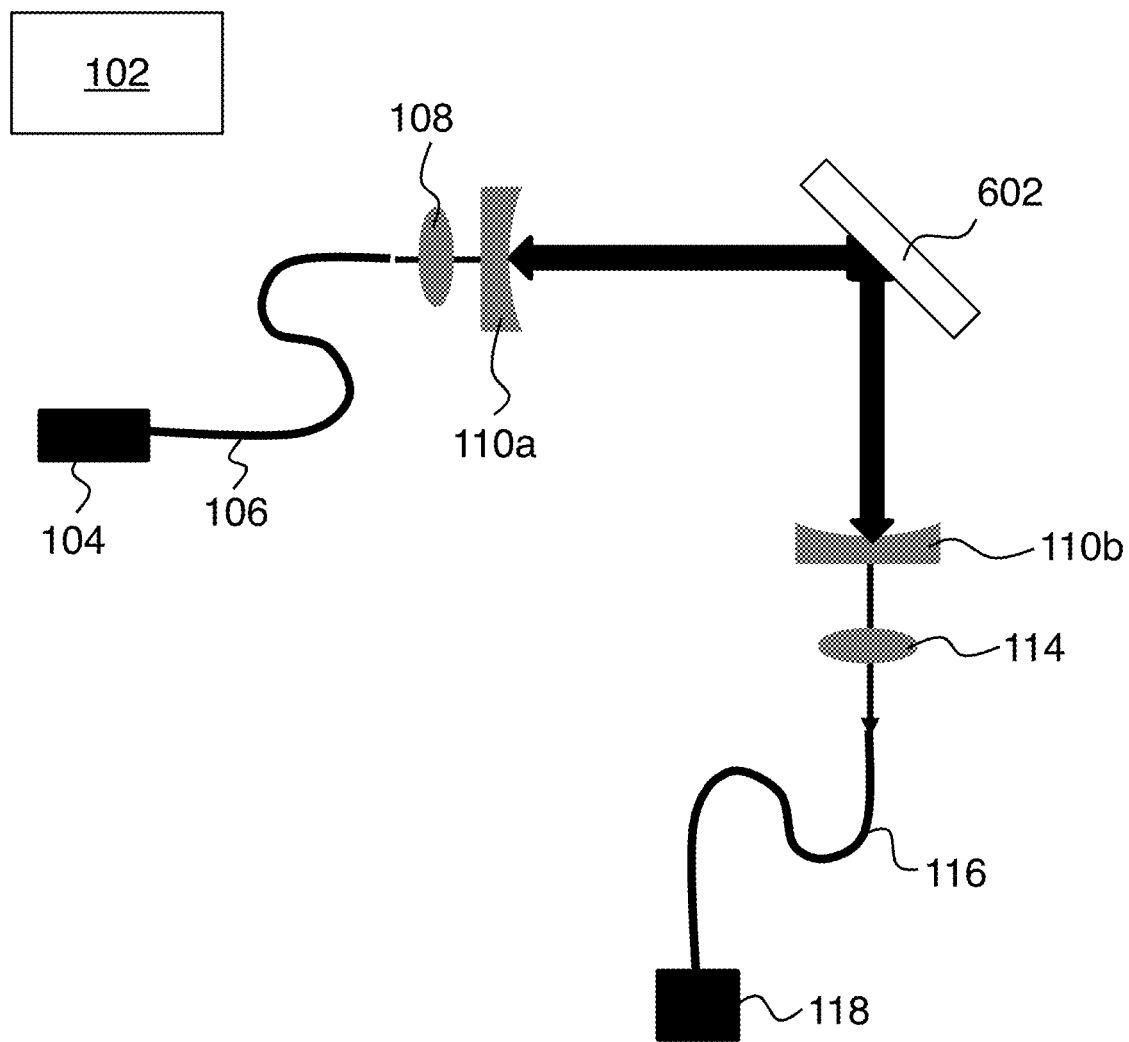
FIG. 6 shows an embodiment of the invention having a folded linear cavity.

FIG. 6 shows an embodiment of the invention having a folded linear cavity. Here the cavity is formed by mirrors 110a, 110b and fold mirror 602. More generally, the resonant optical cavity can be selected from the group consisting of: two mirror cavities, three-mirror ring cavities and three-mirror folded linear cavities.

Figure 7:
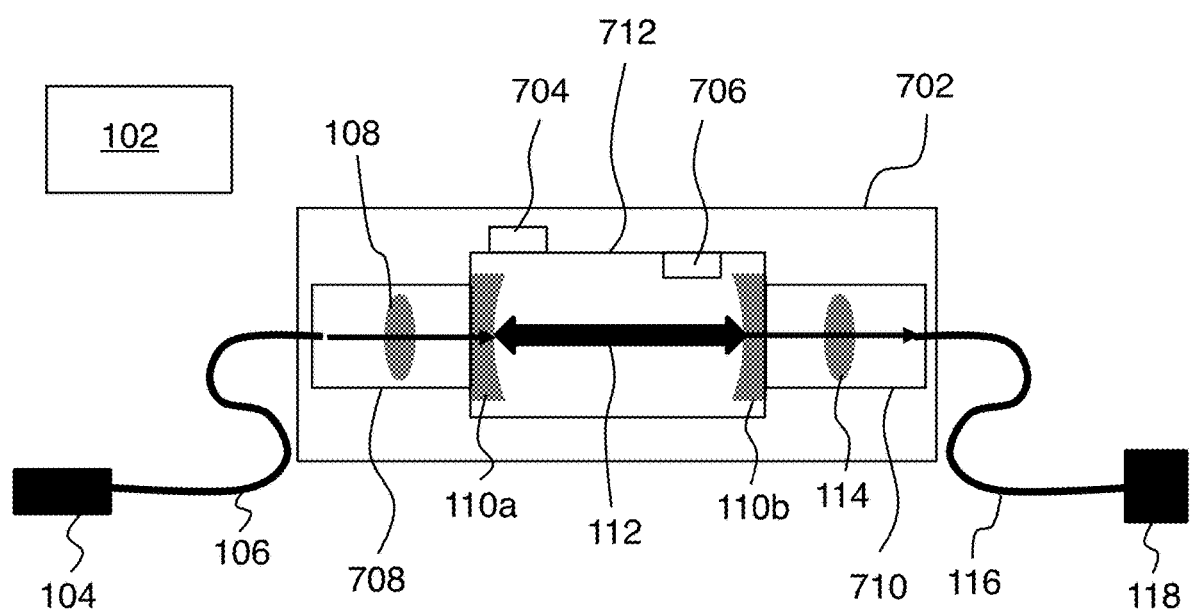
FIG. 7 shows an embodiment of the invention having a preferred cavity housing configuration.

FIG. 7 shows an embodiment of the invention having a preferred cavity housing configuration. This example is the example of FIG. 1 with the addition of environment control box 702 and cavity body structure 712. Environment control box 702 can be configured to regulate a temperature of the cavity and/or pressure of a gas surrounding the cavity. A temperature sensor 704 can be configured to measure a temperature of the resonant optical cavity. A pressure sensor 706 can be configured to measure a pressure of the gas sample in the resonant optical cavity.

A volume 708 between the first single mode optical fiber 106 and the resonant optical cavity can be sealed. Similarly, a volume 710 between the second single mode optical fiber 116 and the resonant optical cavity can be sealed. Sealing either or both of these volumes can advantageously provide increased stability of optical coupling to the resonant cavity. Sealing either or both of these volumes can also provide an additional protection of optical components, especially an optical fiber against dust particles. Sealing either or both of these volumes may also time-stabilize spectral ripples caused by unwanted reflections between optical components.

The invention claimed is:

1. Apparatus for performing low noise cavity enhanced absorption spectroscopy, the apparatus comprising:
   a resonant optical cavity configured to include a gas sample, wherein the resonant optical cavity supports $TEM_{mnq}$ modes having longitudinal index q and transverse indices m and n, wherein $f_{mnq}$ is a frequency of the $TEM_{mnq}$ mode;
   an optical source configured to provide light to the resonant optical cavity, wherein the light from the optical source has a full-width half-maximum line width $\Delta f_L$, and wherein the light from the optical source has a tunable output frequency;
   an optical detector configured to receive light from the resonant optical cavity;
   wherein light is coupled from the optical source to the optical cavity via first coupling optics including a first single mode optical fiber coupled to the resonant optical cavity;
   wherein the first coupling optics provides first mode selective coupling of the optical source to a selected $TEM_{mnq}$ mode ($TEM_{00q0}$) of the resonant optical cavity having m=n=0 and q=q$_0$, wherein the $TEM_{00q0}$ mode has a frequency $f_{00q0}$ and has a full-width half-maximum line width $\Delta f_{00q0}$;
   wherein light is coupled from the resonant optical cavity to the optical detector via second coupling optics including a second single mode optical fiber coupled to the resonant optical cavity;
   wherein the second coupling optics provides second mode selective coupling of the $TEM_{00q0}$ mode to the optical detector;
   wherein a round trip path length of the resonant optical cavity is selected such that the modes $TEM_{mnq}$ for 0<m+n<13 and for all q satisfy a design condition given by $|f_{mnq} - f_{00q0}| > \max(\Delta f_L, \Delta f_{00q0})$; and
   a processor configured to determine concentration of one or more gas analytes in the gas sample from measurements of loss in the resonant optical cavity.

2. The apparatus of claim 1, wherein the first mode selective coupling provides a coupling efficiency η1 from the optical source to the $TEM_{00q0}$ mode, and wherein the first mode selective coupling provides a coupling efficiency of 0.1η1 or less from the optical source to any $TEM_{mnq}$ mode of the resonant optical cavity having m+n>0.

3. The apparatus of claim 1, wherein the second mode selective coupling provides a coupling efficiency η2 from the $TEM_{00q0}$ mode to the optical detector, and wherein the second mode selective coupling provides a coupling efficiency of 0.1η2 or less from any $TEM_{mnq}$ mode of the resonant optical cavity having m+n>0 to the optical detector.

4. The apparatus of claim 1, wherein the first coupling optics includes a polarizer configured to provide polarization selective excitation of modes of the resonant optical cavity.

5. The apparatus of claim 1, wherein the first single mode optical fiber is a polarization-maintaining fiber.

6. The apparatus of claim 1, wherein the second single mode optical fiber is a polarization-maintaining fiber.

7. The apparatus of claim 1, wherein the resonant optical cavity is selected from the group consisting of: two mirror cavities, three-mirror ring cavities and three-mirror folded linear cavities.

8. The apparatus of claim 1, wherein the processor is configured to determine the loss in the resonant optical cavity from a ring-down time of the resonant optical cavity.

9. The apparatus of claim 1, wherein the processor is configured to determine the loss in the resonant optical cavity from absorption in the resonant optical cavity.

10. The apparatus of claim 1, wherein the first coupling optics includes a Faraday isolator configured to provide optical isolation of the first single mode optical fiber from light emitted from the resonant optical cavity toward the first single mode optical fiber.

11. The apparatus of claim 1, wherein the second coupling optics includes a Faraday isolator configured to provide optical isolation of the resonant optical cavity from light reflected by the second single mode optical fiber.

12. The apparatus of claim 1, wherein the first single mode optical fiber and the second single mode optical fiber are selected from the group consisting of: polyimide coated optical fibers and infrared optical fibers.

13. The apparatus of claim 1, wherein the processor is configured to determine a temperature and a pressure of the gas sample with a spectroscopic method.

14. The apparatus of claim 1, wherein the resonant optical cavity is disposed within a pressure regulated box configured to regulate a pressure of a gas surrounding the cavity.

15. The apparatus of claim 1, wherein the resonant optical cavity is disposed within a temperature regulated box configured to regulate a temperature of the cavity.

16. The apparatus of claim 1, wherein the first single mode optical fiber and the second single mode optical fiber are CTE (coefficient of thermal expansion) matched to the resonant optical cavity to 10% or better.

17. The apparatus of claim 1, wherein a volume between the first single mode optical fiber and the resonant optical cavity is sealed.

18. The apparatus of claim 1, wherein a volume between the second single mode optical fiber and the resonant optical cavity is sealed.

19. The apparatus of claim 1, further comprising a temperature sensor configured to measure a temperature of the resonant optical cavity.

20. The apparatus of claim 1, further comprising a pressure sensor configured to measure a pressure of the gas sample in the resonant optical cavity.

21. The apparatus of claim 1, further comprising an optical aperture placed in the resonant optical cavity, wherein FWHM is a full width half maximum beam diameter of the $TEM_{00q0}$ mode at a location of the aperture, wherein a beam radius parameter w=FWHM/sqrt(2 ln 2), and wherein a distance between any point on an edge of the aperture and an axis of the $TEM_{00q0}$ mode is in a range from 3 w to 12 w.

* * * * *